(12) United States Patent
Juschka et al.

(10) Patent No.: US 7,044,116 B2
(45) Date of Patent: May 16, 2006

(54) EXHAUST HEAT EXCHANGER IN PARTICULAR FOR MOTOR VEHICLES

(75) Inventors: Winfried Juschka, Stuttgart (DE); Rainer Lutz, Steinheim (DE)

(73) Assignee: BEHR GmbH & Co. KG, Stuttgart (DE)

( * ) Notice: Subject to any disclaimer, the term of this patent is extended or adjusted under 35 U.S.C. 154(b) by 0 days.

(21) Appl. No.: 10/511,726

(22) PCT Filed: Apr. 11, 2003

(86) PCT No.: PCT/EP03/03769

§ 371 (c)(1),
(2), (4) Date: Oct. 18, 2004

(87) PCT Pub. No.: WO03/091650

PCT Pub. Date: Nov. 6, 2003

(65) Prior Publication Data

US 2005/0199227 A1  Sep. 15, 2005

(30) Foreign Application Priority Data

Apr. 25, 2002 (DE) ................................. 102 18 521

(51) Int. Cl.
*F02B 47/08* (2006.01)

(52) U.S. Cl. ..................... 123/568.12; 165/86

(58) Field of Classification Search .......... 123/568.12, 123/568.17; 165/81, 86, 52; 60/320
See application file for complete search history.

(56) References Cited

U.S. PATENT DOCUMENTS

| | | | |
|---|---|---|---|
| 1,558,139 A | 10/1925 | Zimmermann | |
| 1,724,351 A | 8/1929 | Henderson et al. | |
| 1,780,837 A | 11/1930 | Nott | |
| 1,809,910 A | 6/1931 | Price | |
| 2,075,511 A | 3/1937 | De Baufre | |
| 2,488,807 A | 11/1949 | Currie | |
| 2,607,567 A | 8/1952 | Hobbs | |
| 3,494,414 A | 2/1970 | Warner | |
| 3,907,030 A * | 9/1975 | Moss et al. .................. | 165/162 |
| 3,937,196 A * | 2/1976 | Cook et al. ............ | 123/568.12 |
| 4,133,374 A | 1/1979 | York | |
| 4,171,832 A * | 10/1979 | Metcalfe ....................... | 285/41 |
| 4,328,860 A * | 5/1982 | Hoffmuller ................... | 165/81 |
| 4,635,712 A | 1/1987 | Baker et al. | |
| 4,685,292 A * | 8/1987 | Brigham et al. .............. | 60/320 |
| 4,773,475 A | 9/1988 | Sleep, Jr. | |
| 4,974,569 A | 12/1990 | Ampferer et al. | |

(Continued)

FOREIGN PATENT DOCUMENTS

CH  98648  4/1923

(Continued)

*Primary Examiner*—Mahmoud Gimie
(74) *Attorney, Agent, or Firm*—Foley & Lardner LLP

(57) ABSTRACT

The invention relates to an exhaust heat exchanger (1), in particular an exhaust cooler for motor vehicles with exhaust recycling, comprising a housing sleeve (2) for a coolant and a nest of tubes (3) with exhaust flowing through and coolant circulating around the above which are mounted on the housing sleeve by means of tube plates (4), whereby said nest of tubes, the tube plate and the housing sleeve form a closed force flow. According to the invention, a sliding seating (5) is arranged in the force flow, either in the housing sleeve or between a tube plate and the housing sleeve. The various expansions of the nest of tubes and of the housing sleeve are thus compensated for, such that unsupportable high loads do not occur in the components of the exhaust heat exchanger.

22 Claims, 4 Drawing Sheets

U.S. PATENT DOCUMENTS

| | | |
|---|---|---|
| 5,020,587 A | 6/1991 | Mongia et al. |
| 5,022,581 A | 6/1991 | Zimmer |
| 5,048,596 A | 9/1991 | Lu |
| 5,584,340 A | 12/1996 | Derosier |
| 6,116,026 A * | 9/2000 | Freese, V .................. 60/605.2 |
| 6,129,142 A | 10/2000 | Beldam |
| 6,206,086 B1 | 3/2001 | McKey |
| 6,269,870 B1 | 8/2001 | Banzhaf et al. |
| 6,321,835 B1 | 11/2001 | Damsohn et al. |
| 6,412,548 B1 * | 7/2002 | Terashima et al. ....... 165/134.1 |
| 6,474,408 B1 * | 11/2002 | Yeh et al. ..................... 165/82 |
| 6,513,508 B1 * | 2/2003 | Fischer et al. ......... 123/568.17 |
| 2004/0244946 A1 | 12/2004 | Schindler |
| 2005/0034843 A1 | 2/2005 | Schindler et al. |
| 2005/0224213 A1 | 10/2005 | Kammler |

FOREIGN PATENT DOCUMENTS

| | | |
|---|---|---|
| DE | 29 30 577 A1 | 2/1981 |
| DE | 34 35 093 A1 | 4/1986 |
| DE | 3 502 116 A1 | 7/1986 |
| DE | 296 12 361 U1 | 10/1996 |
| DE | 296 22 411 U1 | 3/1997 |
| DE | 196 54 368 A1 | 6/1998 |
| DE | 199 07 163 A1 | 10/1999 |
| DE | 100 09 179 A1 | 9/2001 |
| EP | 0 422 370 B1 | 4/1991 |
| EP | 0 930 429 A2 | 7/1999 |
| FR | 2 625 301 A3 | 6/1989 |
| GB | 315934 | 7/1929 |
| GB | 1101867 | 1/1968 |
| GB | 2 096 758 A | 10/1982 |
| GB | 2 164 738 A | 3/1986 |

* cited by examiner

EXHAUST HEAT EXCHANGER IN PARTICULAR FOR MOTOR VEHICLES

BACKGROUND OF THE INVENTION

The invention relates to an exhaust heat exchanger in particular for motor vehicles having an exhaust gas recirculation system (EGR), composed of a housing jacket for a coolant, and of a nest of pipes through which exhaust gas flows on the inside and around which coolant flows on the outside and which is held in the housing jacket by means of pipe plates, the nest of pipes, pipe plates and housing jacket forming an enclosed structure—such an exhaust heat exchanger has been disclosed by DE-A 199 07 163 by the applicant.

This known exhaust heat exchanger is an exhaust gas radiator such as is used in motor vehicles for recirculating exhaust gases in order to cool the hot exhaust gases. The exhaust gas radiator which is manufactured from stainless steel is essentially composed of a housing with a housing jacket through which a coolant flows, said coolant being removed from the coolant circuit of the internal combustion engine of the motor vehicle. A nest of pipes whose pipe ends are held by pipe plates which are themselves connected to the housing jacket is arranged in the housing jacket. The pipe ends are welded tightly to the pipe plates and the pipe plates are welded at the circumference to the housing jacket. In this respect the two pipe plates form, together with the housing jacket, what are referred to as fixed bearings. When this exhaust gas radiator operates, the pipes and housing jacket heat up to differing degrees because the exhaust gases flowing through the pipes have a higher temperature than the coolant flowing around the housing jacket. As a result, different degrees of expansion between the nest of pipes and the housing jacket occur, which leads to thermally induced stresses, i.e. compressive stresses in the pipes and tensile stresses in the housing jacket and flexural stresses in the pipe plates. The pipes of the nest of pipes, the pipe plates which hold the pipe ends, and the housing jacket thus form an enclosed structure in which the pipes are supported on the housing jacket by means of the pipe plates. In particular, in the case of exhaust gas coolers with a long length, such as are used in utility vehicles, the stresses which occur owing to the different degrees of expansion can lead to individual components failing or to the connection between the pipe plates being destroyed.

The object of the present invention is to reduce these thermally induced stresses, i.e. to decrease the resulting stresses in the components of the exhaust heat exchanger in order to achieve higher safety and a longer service life for the exhaust heat exchanger mentioned in the beginning.

SUMMARY OF THE INVENTION

The means of solving this object is proposed by a sliding fit being arranged within each enclosing structure, i.e. a fit between two components which can slide in relation to one another, that is to say what is referred to as a loose bearing, in contrast to a fixed bearing such as is present in the prior art of the generic type. Such a sliding fit compensates for the different degrees of expansion of the nest of pipes and housing, i.e. the abovementioned stresses do not occur at all. The sliding fit can be installed structurally at any desired location of the enclosing structure, it being necessary where possible to avoid the coolant and exhaust gas becoming mixed with one another, which could lead to damage to the engine.

According to one advantageous development of the invention, the sliding fit is arranged in the housing. This solution has the advantage that relatively large sliding surfaces are available and that there is no risk of coolant becoming mixed with the exhaust gas, or vice versa when there is a leakage due to the sliding fit. The housing jacket is divided transversely with respect to the direction of the force flux, i.e., coolant flow, and both housing parts are assembled in a telescopic fashion so that, when the nest of pipes experiences severe expansions, they can be pulled apart from one another without stresses occurring in the housing jacket, in the pipe plate or in the nest of pipes.

According to one advantageous development the sliding fit is composed of an outer ring and an inner ring between which a plastic sliding layer is arranged in order to improve the sliding properties. Both rings are pushed onto the end regions of the housing parts of the prefabricated sliding fit, and preferably bonded to said housing parts. The bonding avoids excessive application of heat and thus possible distortion of the components. The fitting on and bonding of the internal ring and outer ring is advantageous in particular when the housing jacket has a somewhat rugged contour: the surfaces of the inner and outer ring which slide one on the other can be configured as simple contours which can be sealed satisfactorily, for example, as a polygonal contour.

According to one advantageous development of the invention, the sliding fit is arranged between one of the two pipe plates and the housing. This solution thus provides a fixed bearing and a loose bearing for the nest of pipes. As a result, the nest of pipes can expand freely with respect to the housing jacket so that the abovementioned compressive stresses do not occur in the pipes and the abovementioned tensile stresses do not occur in the housing jacket. The pipe plate which is embodied as a sliding fit thus has a sliding surface which slides along an assigned sliding surface of the housing jacket and is sealed with respect thereto, preferably by means of O rings.

According to one development of the invention, a drainage, which is connected to the atmosphere, is provided between the O rings, i.e. between two O rings. This drainage provides the advantage that the coolant and exhaust gas cannot mix if an O ring or a corresponding seal fails because either the exhaust gas or the coolant escape to the outside through the drainage.

According to one advantageous development, the drainage is embodied as a slit in the housing, i.e. the housing is divided by a joint and is held spaced apart by means of spacer sleeves which are arranged on the circumference. If the seal fails, exhaust gas or coolant can be conducted away to the outside through the slit.

According to one advantageous alternative, the drainage is formed between two O rings as an annular groove in which the leakage fluid or the leakage gas collect and can escape to the outside via drainage openings which are arranged in the annular groove. This solution is structurally simple since the housing does not need to be divided.

BRIEF DESCRIPTION OF THE DRAWINGS

Exemplary embodiments of the invention are illustrated in the drawing and will be described in more detail below. In said drawing:

FIG. 2a shows a side view of the exhaust gas radiator according to FIG. 2, FIG. 2b shows a section through the exhaust gas radiator according to FIG. 2 in the sectional plane IIb—IIb, FIG. 2c shows the sliding fit as an individual unit.

DETAILED DESCRIPTION OF THE EMBODIMENTS

Figure 1:
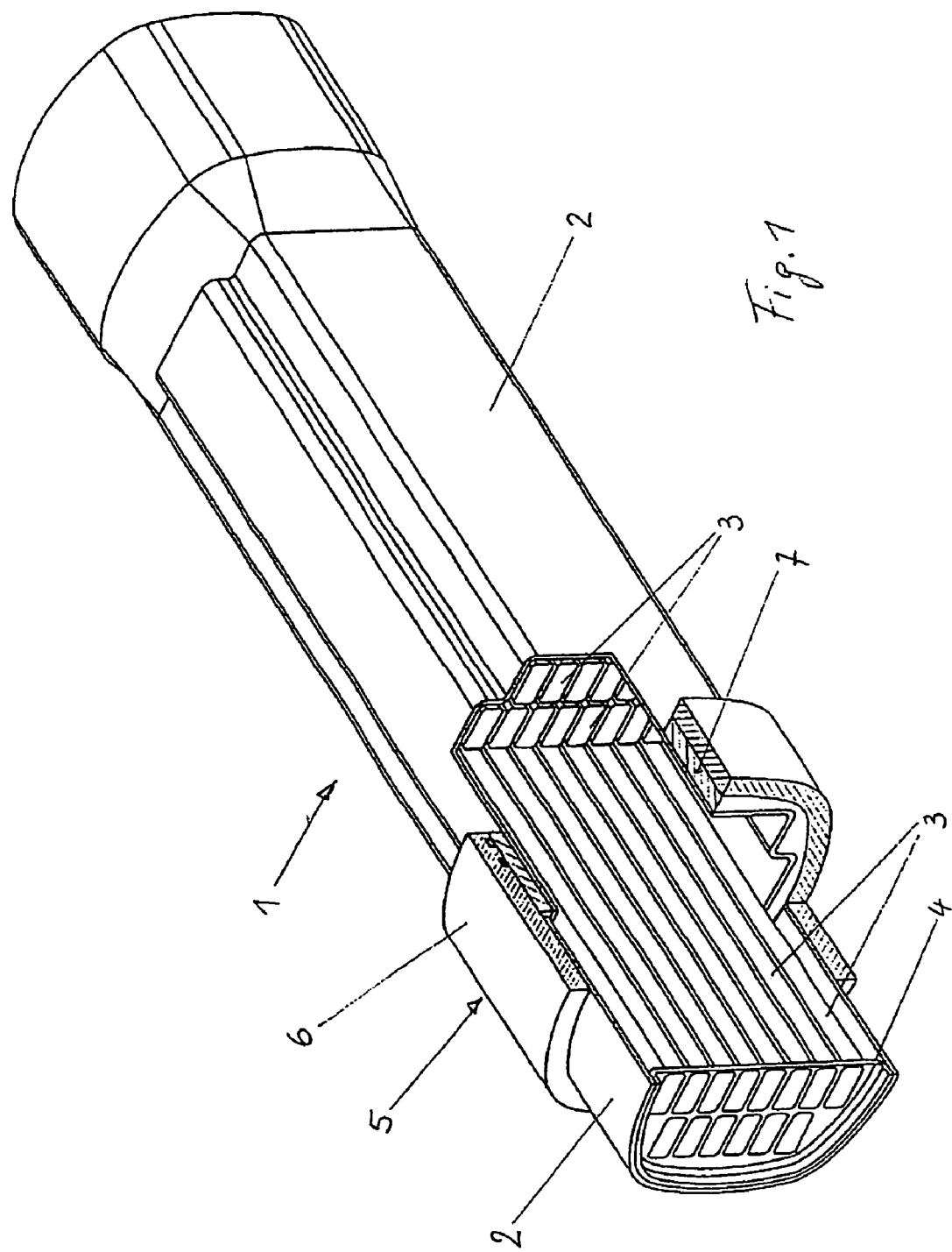
FIG. 1: shows a perspective view of an exhaust gas radiator with a sliding fit in the housing jacket.

FIG. 1 shows a perspective view of an exhaust gas radiator 1 for a motor vehicle with an exhaust gas recirculation system (EGR). Such exhaust gas recirculation systems are used for recirculation cooling of the hot gases of an internal combustion engine (not illustrated) before they are combined with the intake air and fed to the intake tract of the internal combustion engine. The exhaust gas cooler 1 is composed of a housing jacket 2, which holds in it a nest of pipes which are composed of exhaust gas pipes 3. The ends of the pipes 3 are fastened to a pipe plate 4 which is itself welded to the housing jacket 2. The housing jacket 2 has a sliding fit 5, which is composed of an outer ring 6 and an inner ring 7.

Figure 6:
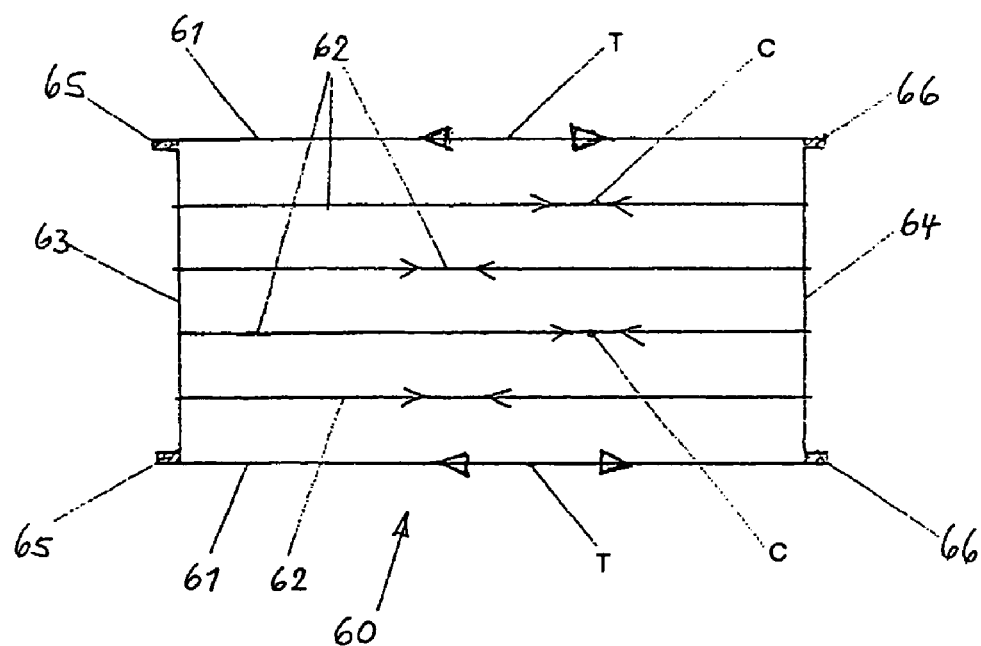
FIG. 6 shows a schematic view of the stresses in an exhaust gas radiator according to the prior art.

Firstly, FIG. 6 shows the stress conditions in an exhaust gas radiator according to the prior art which is cooled by coolant. This schematic illustration corresponds to an exhaust gas radiator according to the prior art by the applicant which is mentioned at the beginning. Such a known heat exchanger 60 is composed of a housing jacket 61 which holds a nest of pipes which is composed of pipes 62 and whose ends are held in pipe plates 63, 64. The pipes 62 are connected at both ends to the pipe plates 63, 64 in a secure and sealed fashion, for example, by means of welded connections. The pipe plates 63, 64 are securely connected to the housing jacket 61 at the circumference by means of welded connections 65, 66. In this way, both pipe plates 63, 64 form two fixed bearings with the housing jacket 61. When such an exhaust gas radiator 60 is operating, the hot exhaust gas flows through the pipes 62, while coolant at a considerably lower temperature is applied to the inside of the housing jacket 61. As a result, different degrees of expansion between the pipes 62 and the housing jacket 61 are produced. For this reason, compressive stresses, which are characterized by arrows and the letter C (compression) which are directed one against the other are formed in the pipes 62. These compressive stresses continue further to the housing jacket 61 via the pipe plates 63, 64 and the welded connections 65, 66, tensile stress, characterized by the letter T (tension) and arrows pointing away from one another, then building up in the said housing jacket 61. The tensile stresses T and the compressive stresses C thus form an enclosed force flux or force flux ring over the pipe plates 63, 64 in which flexural and shearing stresses (not illustrated) occur.

FIG. 1 shows a perspective view of an exhaust gas radiator 1 for a motor vehicle with an exhaust gas recirculation system (AGR). Such exhaust gas recirculation systems are used for recirculation cooling of the hot gases of an internal combustion engine (not illustrated) before they are combined with the intake air and fed to the intake tract of the internal combustion engine. The exhaust gas radiator 1 is composed of a housing jacket 2 which holds in it a nest of pipes which are composed of exhaust gas pipes 3. The ends of the pipes 3 are fastened to a pipe plate 4 which is itself welded to the housing jacket 2. The housing jacket 2 has a sliding fit 5 which is composed of an outer ring 6 and an inner ring 7.

Figure 2:
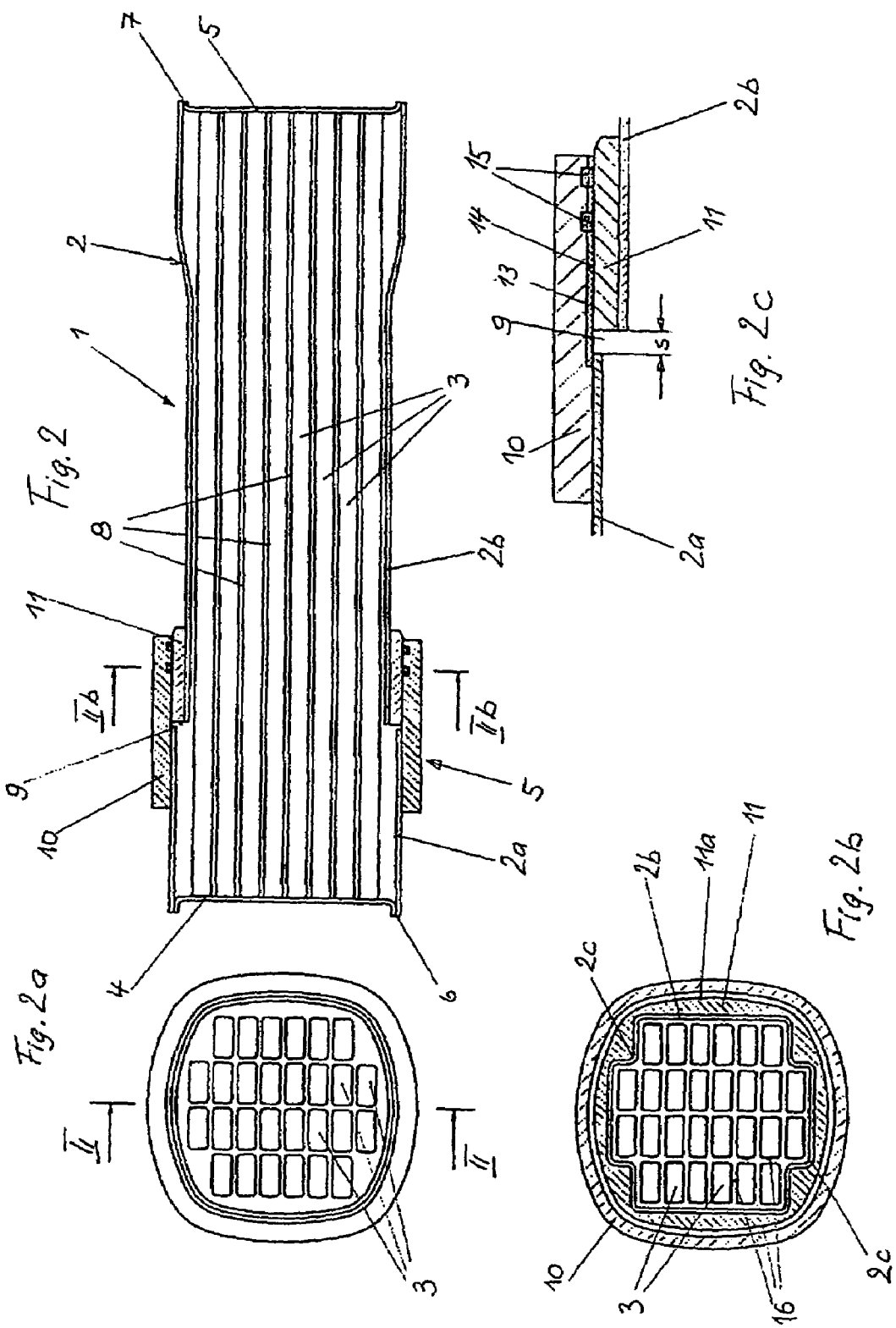
FIG. 2 shows the exhaust gas radiator according to FIG. 1 in a longitudinal section.

FIG. 2 shows the exhaust gas radiator 1 according to FIG. 1 in a sectional view, i.e. in a longitudinal section through the exhaust gas pipes 3 which are held at the ends in the two pipe plates 4 and 5, i.e. are, for example, connected to the pipe plates 4, 5 by means of a welded connection. Said pipe plates 4, 5 are connected at the circumference to the housing jacket 2 in a secure and fluid-tight fashion by means of welded connections 6, 7. The exhaust gas of the internal combustion engine (not illustrated) flows through the exhaust gas pipes 3, and coolant, which is removed from the coolant circuit (not illustrated) of the internal combustion engine, flows around the exhaust gas pipes 3, i.e. through the gaps 8 left between them. The connections for the inflow and outflow of the coolant for the housing jacket 2 are not illustrated for the sake of simplicity. The housing 2 is composed of two housing parts 2a and 2b which have a joint 9. In the region of this joint 9, the housing part 2b which is arranged to the right in the drawing has a smaller cross section than the housing part 2a which is illustrated to the left in the drawing. An outer ring 10 is attached to the housing part 2a, and an inner ring 11 is attached to the housing part 2b. The outer ring 10 and the inner ring 11 together form the sliding fit 5, which is illustrated as a detail in FIG. 2c.

FIG. 2c shows the end regions of the housing parts 2a, 2b in the region of the joint 9, the end sides of the housing parts 2a, 2b being spaced apart from one another by a gap s. The inner ring 11 is attached to the housing part 2b by bonding and the outer ring 10 is attached to the housing part 2a by means of a bonded connection. The outer ring 10 overlaps the inner ring 11 and forms with it a sliding fit 13. A plastic layer 14 is securely attached to the internal surface of the outer ring 10 in the region of the sliding fit 13. In contrast, the outside of the inner ring 11 is metallically smooth, for example ground. This results in a low-friction sliding pairing between the plastic layer 14 and the metallic surface of the inner ring 11 for the sliding fit 13. The sliding fit 13 is sealed with respect to the outside, i.e. with respect to the atmosphere, by means of two O rings 15 so that coolant cannot escape to the outside.

FIGS. 2a, 2b show the cross section of the exhaust gas radiator 1 as a view and as a section. It is apparent that the pipes 3 have a rectangular cross section and are at approximately equal distances 16 from one another. Owing to this arrangement of the pipes 3, an approximately rectangular profile with shoulders 2c is obtained for the contour of the housing jacket 2b. The contour of the inner ring 11 is adapted to this somewhat rugged contour which is bent by the shoulders 2c. In contrast, the outer contour 11a of the inner ring is smoothed and has an approximately polygonal profile without severe curvatures, and this surface can therefore be manufactured relatively easily as a smooth surface and can be sealed with respect to the inner surface of the outer ring 10 using simple means such as O rings 15.

The outer ring 10 and inner ring 11, plastic sliding layer 14 and O rings 15 can be manufactured together as a prefabricated unit, i.e. as a prefabricated sliding fit 5, and then connected to the housing parts 2a, 2b by means of the bonded connection already mentioned.

When the exhaust gas radiator 1 is operating, the sliding fit 5 ensures that the housing 2 and the housing parts 2a and 2b can follow the relatively severe expansion of the pipes 3 by moving in relation to one another—thermal stresses and the excessive stresses of the components are thus avoided.

Figure 3:
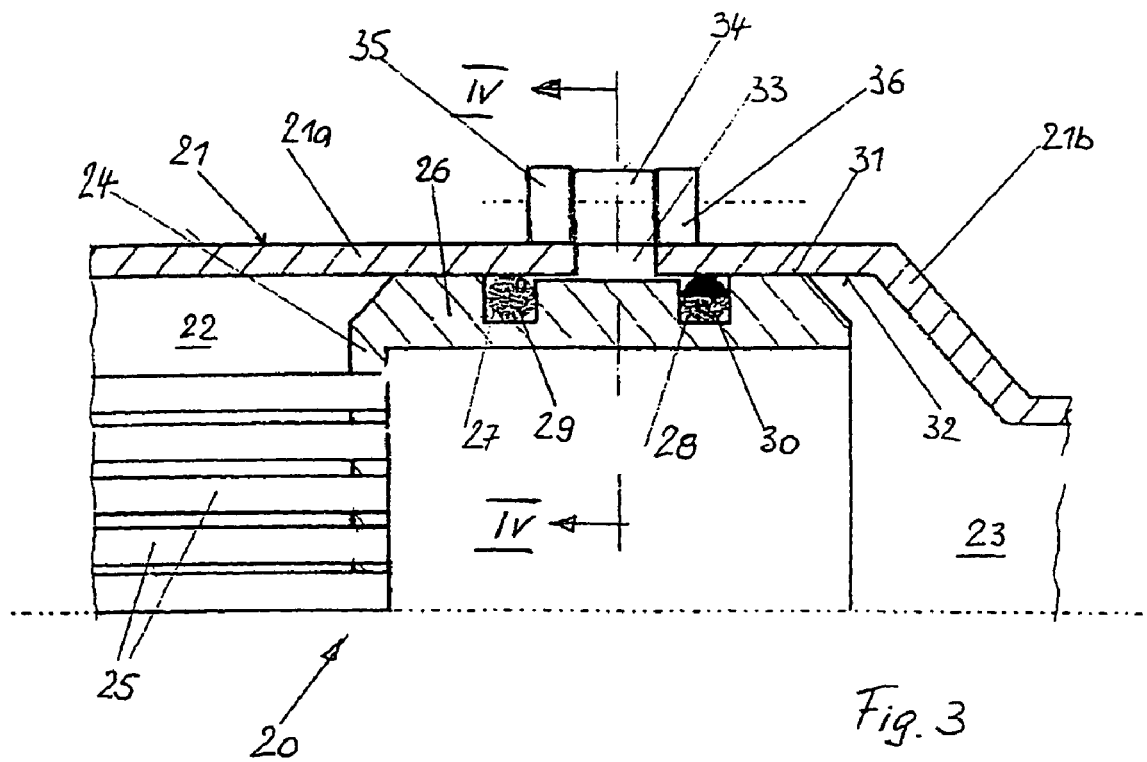
FIG. 3 shows a further embodiment of an exhaust gas radiator with the sliding fit between the pipe plate and housing jacket.

FIG. 3 shows a further exemplary embodiment of the invention for a sliding fit, i.e. an exhaust gas radiator 20 of which only the region of the sliding fit is represented as a detail. The exhaust gas radiator 20 has a housing jacket 21 which comprises a coolant region 22 and an exhaust gas region 23. A pipe plate 24 in which exhaust gas pipes 25 are attached, for example by soldering or welding, is arranged inside the housing jacket 21. The pipe plate 24 is adjoined by a hollow cylindrical region which holds in each case one O ring 29, 30 in each of two annular grooves 27, 28. The cylindrical attachment 26 has an outer sliding surface 31 which bears in a sliding fashion against an inner surface 32 of the housing jacket 21 and thus forms a sliding fit 31/32 with the housing jacket 21. The housing 21 is divided by a slot 33 between the two O rings 29, 30. It thus has a left-hand housing part 21a and a right-hand housing part 21b. Both housing parts 21a, 21b are held apart by a constant distance, i.e. the width of the slot 33, by means of spacer sleeves (cf. FIG. 4) distributed over the circumference and attachment eyelets 35, 36 which are provided on the housing parts 21a, 21b. The attachment of eyelets 35, 36 and the spacer sleeves 34 are clamped to one another by means of screw or bolt connections (not illustrated). The slot 33 is thus connected to the atmosphere, i.e. the outside of the housing jacket 21.

Figure 4:
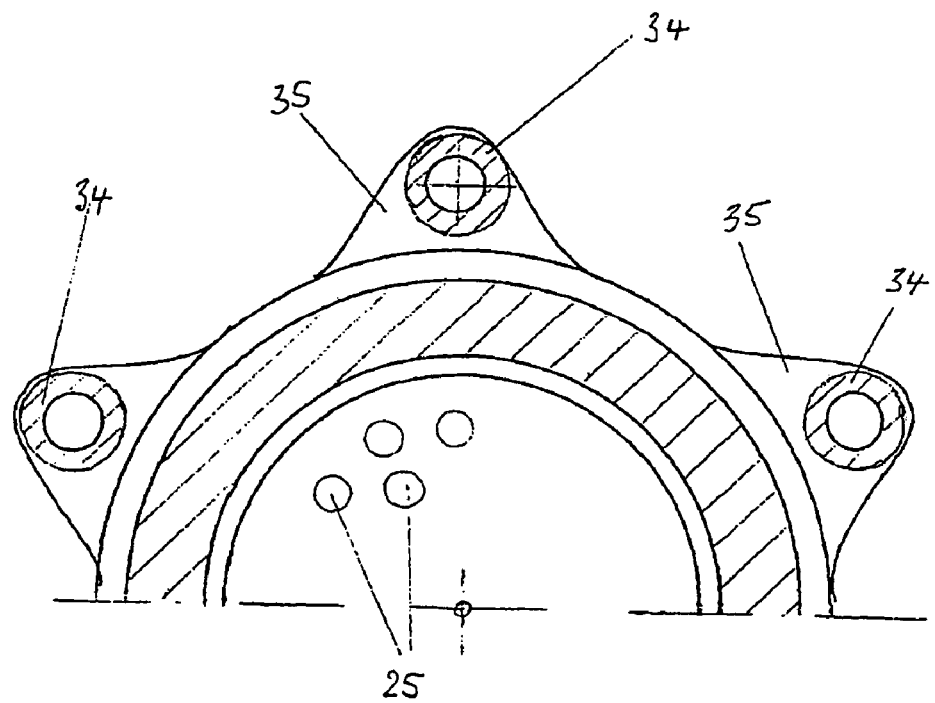
FIG. 4 shows a section through the exhaust gas radiator according to FIG. 3 in the plane IV—IV.

FIG. 4 shows a section along the sectional plane IV—IV in FIG. 3, i.e. through the region of the slot 33 and the spacer sleeve 34. The cross section of the pipes 25 is circular here.

When the exhaust gas radiator 20 is operating, hot exhaust gases flow through the region 23 into the interior of the pipes 25, around which coolant, which flows around the inside of the housing jacket 21 flows on the outside, i.e. in the coolant region 22. Said housing jacket 21 is therefore at a lower temperature than that of the exhaust gas pipes 25. The greater degree of expansion of the exhaust gas pipes 25 is compensated by the sliding fit 31/32, i.e. the pipes can expand freely with respect to the housing jacket 21 by means of the pipe plate 24 and the cylindrical attachment 26. The seal between the coolant region 22 and exhaust gas region 23 is provided by means of the O rings 29, 30. If one of these O rings were to lose its sealing effect, coolant would leave the region 22 or exhaust gas would leave the region 23 and enter the slot 33 and pass from there to the outside and into the atmosphere. This prevents either exhaust gas entering the coolant region 22 or coolant entering the exhaust gas region 23 and thus causing damage.

Figure 5:
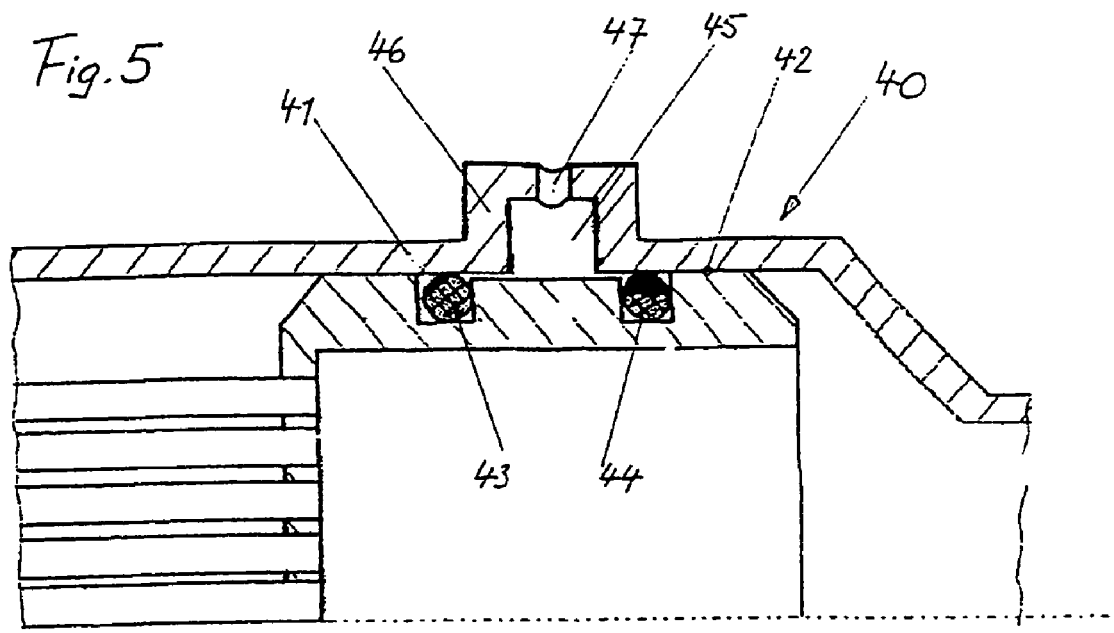
FIG. 5 shows a modification of the exhaust gas radiator according to FIG. 3 with the drainage groove.

FIG. 5 shows a modified exemplary embodiment of the exhaust gas radiator 20 according to FIG. 3, i.e. an exhaust gas radiator 40 with a continuous housing jacket 41 and a sliding fit 42 which corresponds to the sliding fit 31/32 of the exemplary embodiment according to FIG. 3. An annular groove 45, which has a corresponding annular collar 46 (or an integral bead), is integrally formed between two O rings 43, 44. The annular groove 45 is connected to the atmosphere via a drainage opening 47. The drainage which has been described above for the exemplary embodiment according to FIG. 3, i.e. the conduction away of coolant or exhaust gas to the outside is thus possible in the same way. An advantage with this solution is that the housing 41 is in one piece and can thus be manufactured more easily.

The invention claimed is:

1. An exhaust heat exchanger suitable for use in a motor vehicle having an exhaust gas recirculation system, comprising:
   an external housing jacket for a coolant; and
   a plurality of pipes through which exhaust gas flows and around which coolant flows and which are held in the housing jacket by pipe plates;
   wherein the housing jacket and the pipe plates form an enclosed structure that houses the plurality of pipes and contains the coolant flow; and
   wherein a sliding fit is arranged on one surface of the external housing jacket; and
   wherein the sliding fit comprises a sliding seal for preventing the coolant or the exhaust gas from flowing through the sliding fit.

2. The exhaust heat exchanger as claimed in claim 1, wherein the sliding fit is arranged between a first part and a second part of the housing jacket.

3. The exhaust heat exchanger as claimed in claim 1, wherein the sliding fit is arranged between a first one of the pipe plates and the inside surface of the external housing jacket.

4. The exhaust heat exchanger as claimed in claim 2, wherein the housing jacket is divided transversely with respect to the direction of the coolant flow and has a first end region with a relatively large cross section and a second end region with a relatively small cross section, said end regions overlapping in the direction of the coolant flow and being guided and sealed so as to slide one in the other.

5. The exhaust heat exchanger as claimed in claim 4, wherein a plastic layer is arranged as a sliding layer between the end regions.

6. The exhaust heat exchanger as claimed in claim 4, wherein the sliding seal is arranged between the end regions.

7. The exhaust heat exchanger as claimed in claim 6, wherein the sliding seal comprises at least one O-ring.

8. The exhaust heat exchanger as claimed in claim 6, wherein the end regions further comprise an outer annular piece an inner annular piece whose wall thickness is greater than that of the housing jacket.

9. The exhaust heat exchanger as claimed in claim 8, further comprising a plastic layer is applied to the outer annular piece in a securely adhering fashion, and in that the inner annular piece has a metallic smooth surface and forms a sliding fit with the plastic layer.

10. The exhaust heat exchanger as claimed in claim 8, wherein the outer annular piece and the inner annular piece are bonded onto the housing jacket.

11. The exhaust heat exchanger as claimed in claim 9, wherein the outer annular piece, the inner annular piece, the plastic layer and the at least one O-ring are embodied as a prefabricated sliding fit which is finally connected to the end regions of the housing part.

12. The exhaust heat exchanger as claimed in claim 3, wherein the sliding fit is formed by a sliding surface on the first pipe plate and a sliding surface on the housing, wherein the sliding surfaces are sealed by means of at least one O-ring between a coolant side and an exhaust gas side of the heat exchanger.

13. The exhaust heat exchanger as claimed in claim 12, further comprising a drainage pathway that is arranged between two O rings and that is vented to the atmosphere.

14. The exhaust heat exchanger as claimed in claim 13, wherein the drainage pathway comprises a circumferential slit which separates the housing jacket into two housing parts, and wherein the housing parts are held spaced apart from one another by means of at least one spacer sleeve.

15. The exhaust heat exchanger as claimed in claim 14, wherein the housing parts have attachment eyelets which are distributed over the circumference in the region of the slit and between which the at least one spacer sleeve is arranged.

16. The exhaust heat exchanger as claimed in claim 12, wherein the drainage pathway comprises an annular groove in the housing, wherein the annular groove is connected to the atmosphere via at least one drainage opening.

17. The exhaust heat exchanger as claimed in claim 16, wherein the housing comprises a single piece construction.

18. The exhaust heat exchanger as claimed in claim 1, wherein the heat exchanger is made of metal parts.

19. The exhaust heat exchanger as claimed in claim 8, wherein the first and second end regions have an irregular external cross-sectional shape and wherein the inner and outer annular pieces have a regular outer and inner respectively external cross-sectional shape that is different from the cross-sectional shape of the first and second end regions.

20. A vehicle exhaust gas recirculation system, comprising a heat exchanger for cooling the exhaust gas, wherein the exhaust heat exchanger comprises a heat exchanger as claimed in claim 1.

21. A vehicle having an internal combustion engine and an exhaust gas recirculation system for said engine, wherein the exhaust gas recirculation system comprises a system as claimed in claim 20.

22. A method for forming a heat exchanger as defined by claim 8, providing a first housing part and a second housing part, for assembly to form the external housing jacket, wherein the first housing part has a first end region with a relatively large cross section and the second housing part has a second end region with a relatively small cross section, and wherein said end regions are adapted to overlap in the direction of the coolant flow and to slide one in the other when assembled;

providing a pre-assembled unit comprised of the outer annular piece, the inner annular piece, the plastic layer and the sliding seal member comprising at least one O-ring, wherein the inner annular piece is inserted in sliding arrangement inside of the outer annular piece, and the plastic layer and sliding seal member are positioned between the two annular pieces in the sliding arrangement; and assembling the external housing jacket by attaching the first housing part to the outer annular piece and attaching the second housing part to the inner annular piece.

* * * * *